United States Patent [19]

Tanaka et al.

[11] Patent Number: 5,313,601

[45] Date of Patent: May 17, 1994

[54] REQUEST CONTROL APPARATUS

[75] Inventors: Katsumi Tanaka; Toshiteru Shibuya, both of Tokyo, Japan

[73] Assignee: NEC Corporation, Tokyo, Japan

[21] Appl. No.: 91,741

[22] Filed: Jul. 14, 1993

Related U.S. Application Data

[63] Continuation of Ser. No. 869,058, Apr. 16, 1992, abandoned, which is a continuation of Ser. No. 302,756, Jan. 27, 1989, abandoned.

[30] Foreign Application Priority Data

| Jan. 30, 1988 | [JP] | Japan | 63-18551 |
| Jan. 30, 1988 | [JP] | Japan | 63-18552 |

[51] Int. Cl.$^5$ .................. G06F 12/04; G06F 12/08
[52] U.S. Cl. ........................ 395/400; 364/DIG. 1; 364/254.9; 364/254.3; 364/255.1; 364/256.3
[58] Field of Search ................... 395/375, 400, 475

[56] References Cited

U.S. PATENT DOCUMENTS

| 3,701,977 | 10/1972 | Mendelson et al. | 395/425 |
| 3,768,080 | 10/1973 | Boger et al. | 395/400 |
| 4,156,905 | 5/1979 | Fassbender | 395/425 |
| 4,189,768 | 2/1980 | Liptay et al. | 395/375 |
| 4,381,541 | 4/1983 | Baumann, Jr. et al. | 395/425 |
| 4,466,057 | 8/1984 | Houseman et al. | 395/375 |
| 4,495,565 | 1/1985 | Thompson | 395/425 |
| 4,635,194 | 1/1987 | Burger et al. | 395/375 |
| 4,646,312 | 2/1987 | Goldsbury et al. | 371/40.1 |
| 4,843,542 | 6/1989 | Dashiell et al. | 395/425 |

FOREIGN PATENT DOCUMENTS 0217168 4/1987 European Pat. Off. .

Primary Examiner—Debra A. Chun
Attorney, Agent, or Firm—Foley & Lardner

[57] ABSTRACT

A controller for controlling requests to memory, said requests involving executing in a computer system an instruction having a variable length operand, for use in a computer system for managing the main store in a page size of $2^m$ byte units by on demand paring processing and for executing an instruction or an operation in not larger than $2^n$ (n is larger than m) byte operand units includes a detector for detecting the presence of operand data on a same or single page by referencing the (n−m) most significant bits of the n least significant bits of an effective address which has been generated. If the detector has detected the presence of the operand data on the same page, the memory request is altered by dispensing with an unnecessary check request.

4 Claims, 16 Drawing Sheets

OUTPUT 69 GENERATING LOGIC OF JUDGEMENT CIRCUIT (LEAST SIGNIFICANT BIT OF CONTROL STORE)

| DECODER 75 LOGIC | | | | | | | | |
|---|---|---|---|---|---|---|---|---|
| INPUT 68 | | | OUTPUTS 63,64,65,66,67 | | | | | |
| $X_0$ | $X_1$ | $X_2$ | $Y_0(63)$ | $Y_1(64)$ | $Y_2(65)$ | $Y_3(66)$ | $Y_4(67)$ | |
| 0 | 0 | 0 | 0 | 0 | 0 | 0 | 0 | W/R4 |
| 0 | 0 | 1 | 1 | 0 | 0 | 0 | 0 | W/R4 + B1 |
| 0 | 1 | 0 | 0 | 1 | 0 | 0 | 0 | W/R4 + B2 |
| 0 | 1 | 1 | 0 | 0 | 1 | 0 | 0 | W/R4 + B3 |
| 1 | 0 | 0 | 0 | 0 | 0 | 1 | 0 | W/R4 + B4 |
| 1 | 0 | 1 | 0 | 0 | 0 | 0 | 1 | W/R4 + D74 |

W/R4: LEAST SIGNIFICANT BIT OF REGISTER 4 (SIGNAL LINE 50)

B1 : BRANCHING TEST CONDITION 1     (SIGNAL LINE 73)

B2 :          "                2    (   "      72)

B3 :          "                3    (   "      71)

B4 :          "                4    (   "      70)

D74 : OUTPUT OF DETECTING CIRCUIT 57 (   "      74)

MVC INSTRUCTION FORMAT

| 0 | 7 8 | 15 16 | 19 20 | 23 24 | 39 40 | 47 48 | 51 52 | 55 56 | 63 |
|---|---|---|---|---|---|---|---|---|---|
| OP CODE | | L1 | X1 | B1 | D1 | L2 | X2 | B2 | D2 |

FIG. 9

OP CODE: OPERAND CODE OF MVC INSTRUCTION (TENTATIVELY SUPPOSED TO BE 01 FOR THE PREFERRED EMBODIMENTS OF THE PRESENT INVENTION)

L1 : 1ST OPERAND LENGTH

X1 : INDEX REGISTER (GENERAL REGISTER) NUMBER AT THE TIME OF 1ST OPERAND ADDRESS GENERATION

B1 : BASE REGISTER NUMBER AT THE TIME OF 1ST OPERAND ADDRESS GENERATION

D1 : DISPLACEMENT AT THE TIME OF 1ST OPERAND ADDRESS GENERATION

L2 : 2ND OPERAND LENGTH

X2 : INDEX REGISTER (GENERAL REGISTER) NUMBER AT THE TIME OF 2ND OPERAND ADDRESS GENERATION

B2 : BASE REGISTER NUMBER AT THE TIME OF 2ND OPERAND ADDRESS GENERATION

D2 : DISPLACEMENT AT THE TIME OF 2ND OPERAND ADDRESS GENERATION

REQUEST CONTROL APPARATUS

This application is a continuation of application Ser. No. 07/869,058, filed Apr. 16, 1992, now abandoned, which is a continuation of parent application Ser. No. 07/302,756, filed Jan. 27, 1989, now abandoned.

BACKGROUND OF THE INVENTION

The present invention relates to a request control apparatus for controlling requests to data processor stores for use in computer systems.

In a computer using an on-demand-paging processing method, the main store is usually controlled on a page-by-page basis. The absence of the desired piece of information in the main store is referred to as a page fault, which causes an inhibiting factor to normal operation of the processor, i.e., an exception, to be generated. In response to the detection of the generation of such an exception, paging of the absent page into the main store takes place. Thus a page on which the requested piece of information is present is supplied from a secondary store to the main store. In response to this page supply, the execution of the program is resumed from the top of the group of instructions in which the exception was generated.

For a paging technique to be used in the event of a page fault, reference may be made to the published European Patent No. 0217168 AZ.

At the time of resuming the program execution, there arises the need to cancel the partially executed instruction in order to make possible its full reexecution.

Now there is supposed the execution of an instruction which, in a computer using an on-demand-paging processing technique, has a variable-length operand and requires the reading of data on a memory and storing them, either as they or after being operated on, into a memory or a software visible register, or requires storing of the content of a software visible register into a memory. If, in the middle of the execution of such an instruction, an exception due to the aforementioned page fault is generated and if the content of the memory or the software visible memory is rewritten, the execution of the instruction cannot be resumed.

For execution of such an instruction by the prior art, a check request is issued to the beginning and end of the operand. Then, the instruction is processed after confirming that all of the required pages have been supplied to the main store, or supplying the required page or pages according to the check request and confirming this supply.

In this prior art manner of executing an instruction, however, there is the disadvantage that, even in the presence of operand data on the same page, a check request for the end of the operand has to be issued in order to confirm that all the required pages have been supplied to the main store.

SUMMARY OF THE INVENTION

One object of the present invention is, therefore, to provide a request control apparatus free from the above disadvantage.

According to a first aspect of the invention, there is provided a request control apparatus for executing an instruction having a variable-length operand, managing the main store in a page size of $2^n$ byte units by on-demand-paring processing and executing an instruction or an operation in not larger than $2^m$ (n is larger than m) byte operand units, including:

address generation means for generating an address;

detection means for detecting the presence of operand data on the same page by referencing the $(n-m)$ most significant bits of the n least significant bits of an effective address generated by the address generation means; and means for altering a request to a memory and dispensing with the issue of an unnecessary check request if the detection means has detected the presence of said operand data on the same page.

According to a second aspect of the invention, there is provided a request control apparatus for executing an instruction having a variable-length operand, managing the main store in a page size of $2^n$ byte units by on-demand-paging processing and executing an instruction or an operation in not larger than $2^m$ (n is larger than m) byte operand units, including:

address generation means for generating an address;

detection means for detecting the presence of operand data on the same page by referencing the $(n-m+k)$ most significant bits of the least significant n bits of an effective address generated by the address generation means and the k most significant bits of the operand length; and means for altering a request to a memory and dispensing with the issue of an unnecessary check request if the detection means has detected the presence of said operand data on the same page.

BRIEF DESCRIPTION OF THE DRAWINGS

These and other features and advantages of the present invention will become apparent from the following detailed description when taken in conjunction with the accompanying drawings, in which:

FIG. 9 illustrates the format of the MVC instructions used in the preferred embodiment of the invention;

In the figures, the same reference numerals denote the same structural elements, respectively.

DETAILED DESCRIPTION OF THE PREFERRED EMBODIMENTS

Figure 1:
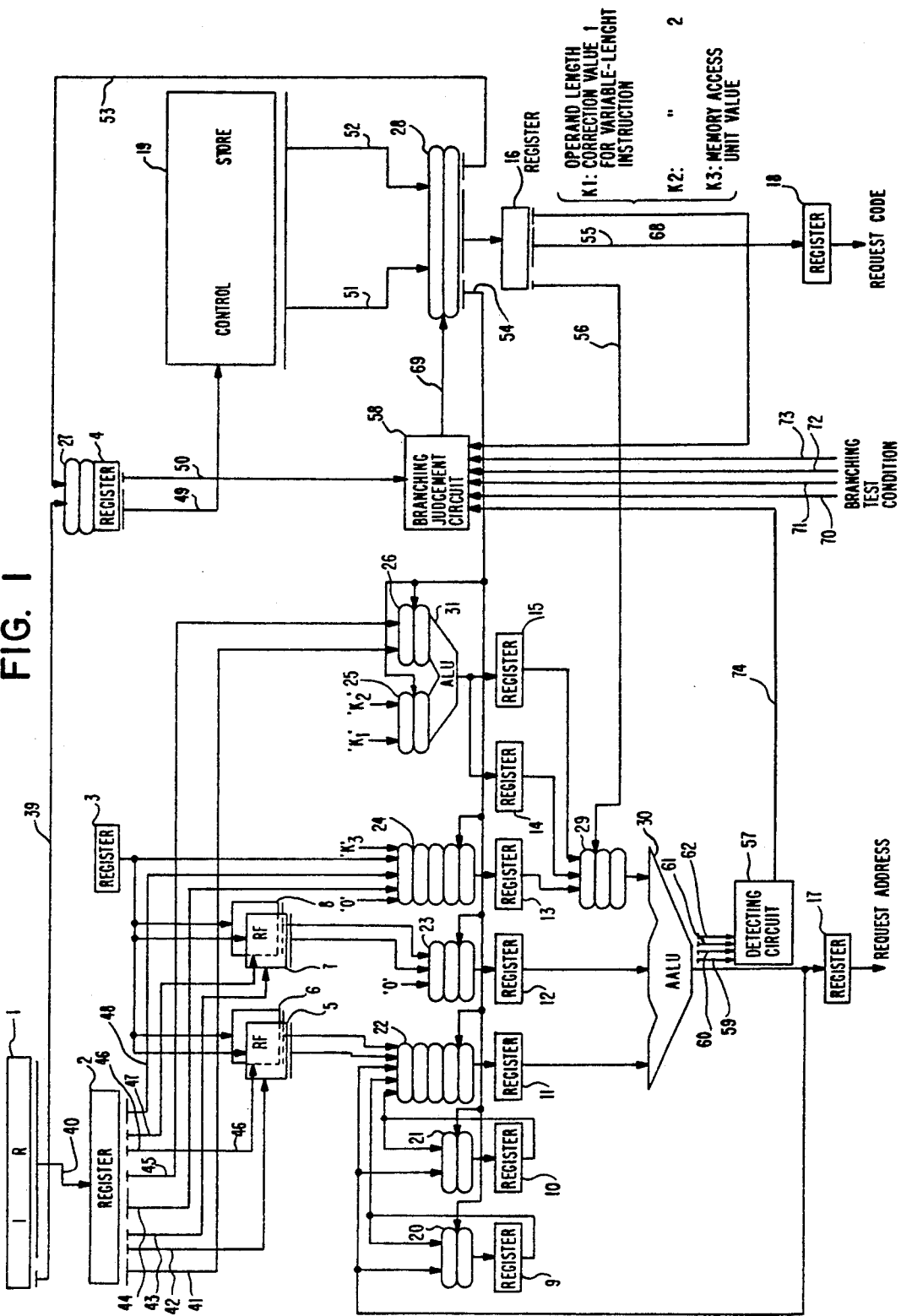
FIG. 1 illustrates the configuration of a first preferred embodiment of the invention.
Figures 3A, 3B:
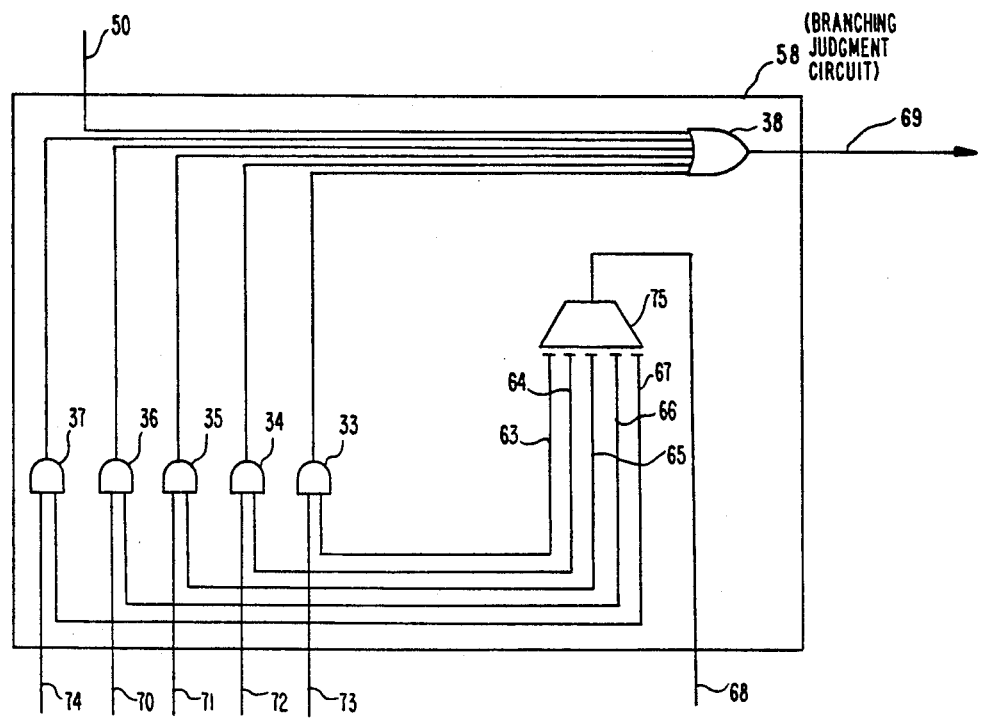
FIG. 3 illustrates the configuration of the branching judgement circuit 58 in FIG. 1.

Referring to FIG. 1, a first preferred embodiment of the present invention comprises an instruction word register 1 for storing an instruction word given from the outside; a register 2 for storing non-OP code parts of the instruction word stored in the register 1; a selector 27 for inputting and selecting the OP code of the instruction word in the register 1; a register 4 for setting the OP code given via the selector 27 in the least significant byte and "0" in every one of the four most significant bits; a register 3 for storing data from a memory or an arithmetic unit; a general register group (hereinafter called the "register file") 5 for use in index qualification when a leading address $a_1$ is generated according to the content of the X1 field of the instruction word, as shown in FIG. 9, stored in the register 2; a selector 22 for selecting an output given from the register file 5 in response to a signal provided via a line 42; a base register group (hereinafter called the "register file") 7 for use in base qualification when a leading address $a_1$ is generated according to the content of the B1 field of the instruction word, as shown in FIG. 9, stored in the register 2; a selector 23 for selecting a content given from the register file 7 in response to a signal provided via a line 43; a selector 24 for selecting the content of the D1 field of the instruction word in the register 2 provided via a line 44; a selector 26 for selecting the content of the L1 field of the instruction word in the register 2 provided via a line 41; a control store 19 for reading out a microinstruction in response to the parts of the content of the register 4 other than the least significant bit; a selector 28 for selecting the microinstruction read out of the control memory 19; a branching judgement circuit 58 for inputting the least significant bit in the register 4 provided via a line 50; selectors 20 to 26 for performing selections in response to an instruction constituting a part of the output of the selector 28 provided via a line 54; an operand length generating adder (hereinafter called the "ALU") 31 for operating on the contents selected by the selectors 25 and 26; registers 14 and 15 for storing the results of operation supplied from the ALU 31; a register 16 for storing such parts of the output of the selector 28 as the selection field of a selector 29, a request code to a memory and an input data field for a decoder 75 in the branching judgment circuit 58, shown in FIG. 3A; the selector 29 for selecting contents supplied from the register 13 to 15 in response to the selection field from the register 16; an effective address generating three-input adder (hereinafter called the "AALU") 30 for generating an effective address on the basis of the result of selection by the selector 29 and contents supplied from registers 11 and 12; a register 17 for storing the effective address supplied from the AALU 30; a detecting circuit 57 for detecting the certain presence of the operand data on the same page with the four most significant (12−8) bits in the 12 least significant bits of the effective address from the AALU 30; and a register 18 for storing a request code supplied from the register 16.

Next will be explained why a move character string (MVC) instruction is a prerequisite to the operation of the first preferred embodiment of the present invention.

An MVC instruction is an instruction to move data an a memory represented by the leading address $a_1$ of an operand and its L1-byte operand length, to a memory space represented by the leading address $a_2$ of another operand and its L2-byte operand length.

The first preferred embodiment of the invention will be described in detail below with reference to this MVC instruction.

Referring to FIG. 9 illustrating the format of an MVC instruction, its instruction word is represented in eight bytes (64 bits). Eight instruction word bits 0 to 7 constitute the operand code (OP code) of the MVC instruction. For this embodiment, the OP code is tentatively referred to as 01H. Instruction bits 8 to 15 and another eight bits 40 to 47 respectively represent the operand length L1 of the operand to be transferred and the operand length L2 of the memory space which is its destination, and each may stand for a length ranging from 1 byte to 256 bytes, the latter being indicated by "0" for the whole pertinent field.

Four instruction word bits each, 16 to 19 and 48 to 51, indicate the general-purpose register numbers to be used for index qualification in generating the leading address $a_1$ of the first operand and the leading address $a_2$ of the second operand, respectively. Other four instruction word bits each, 20 to 23 and 52 to 55, indicate the base register numbers to be used for base qualification in generating said leading addresses $a_1$ and $a_2$. Instruction word bits 24 to 39 and 56 to 63 indicate destination values in generating said leading addresses $a_1$ and $a_2$.

Next will be described in detail the operation which takes place when an MVC instruction is executed in the embodiment of the present invention.

Referring to FIG. 1, the instruction word of the MVC instruction is supplied to the instruction word register 1 (machine cycle $T_0$ in FIGS. 4, 5, 6 and 7). Then in machine cycle $T_1$ of FIGS. 4, 5, 6 and 7, the non-OP code parts of the instruction word are supplied from the register 1 to the register 2, and held there until the completion of the request control for the MVC instruction. At the same timing (machine cycle $T_1$), as the OP code 01H of the MVC instruction word is supplied from the register 1 to the least significant byte of the register 4 via the selector 27, "0" is supplied to every one of its four most significant bits at the same time. The register 3 is intended for receiving data supplied from a memory, an arithmetic unit or the like for effective address generation, updating of the general-purpose registers, updating of the base registers or the like.

Next, in machine cycle $T_2$ of FIGS. 4 to 7, the general register group (hereinafter called the "register file") 5, for use in index qualification when the leading address $a_1$ is generated according to the content of the X1 field of the instruction word supplied to the register 2, is referenced via the signal line 42, and the output of the register file 5 is sent out to the selector 22. The base register group (hereinafter called the "register file") 7, for use in base qualification when the leading address $a_1$ is generated according to the content of the B1 field of the instruction word, is referenced via the signal line 43, and its output is sent out to the selector 23. The content of the D1 field of the instruction word supplied from the register 2 is sent out to the selector 24 via the signal line 44. The L1 field of the instruction word from the register 2 is sent out to the selector 26 via the signal line 41. At the same time, the control store 19 is referenced by the other parts of the register 4 than the least significant bit of the register 4, and the output is sent out to the selector 28. Here is stored in the register 4 the first step of the instruction. Namely, what is stored is a value 001H, consisting of the OP code of the MVC instruction supplied from the register 1 plus the four most significant bits 0, so that the contents stored into control store addresses 001H and 001H via a signal line 49 are sent out to the selector 28 via the signal lines 51 and 52, respectively. The least significant bit of the register 4 is sent out to the branching judgment circuit 58 via the signal line 50.

Referring now to FIG. 3A, in the branching instruction circuit 58, the least significant bit (W/R4) of the register 4 sent out via the signal line 50 is entered into an OR gate 38. At the first step of each instruction, values ($X_0$, $X_1$ and $X_2$) entered into the decoder 75 via a signal line 68 at the final step of control firmware (FW) for all the instructions are secured at "000", so that the outputs ($Y_0$, $Y_1$, $Y_2$, $Y_3$ and $Y_4$) of the decoder 75 are 00000 and those of AND gates 33, 34, 35, 36 and 37, "0". The output of the OR gate 38 depends only on the input of the register 4 entered via the signal line 50. Therefore, the output of the OR gate 38 is "1", which is supplied to the selector 28 via a signal line 69. The selector 28 selects the control FW provided via the signal line 52 from the address 001H in the control store 19. At step A of FIGS. 8A–8E are shown the contents of the control FW represented by the address 001H. In accordance with the contents of the control FW selected by the selector 28 and supplied via the signal line 54, the selectors 22, 23 and 24 respectively select the output of the register file 5, that of the register file 7 and the D1 field of the register 2. These selector outputs are sent out to the registers 11, 12 and 13, respectively. At the same time, in accordance with the contents supplied from the selector 28 via the signal line 54, the selector 25 selects a corrected length value $K_1$ and the selector 26, the L1 field of the register 2. The ALU 31 adds these results of selection and sends out the resultant sum $\underline{l}_1$ to the register 14.

Figure 10A:
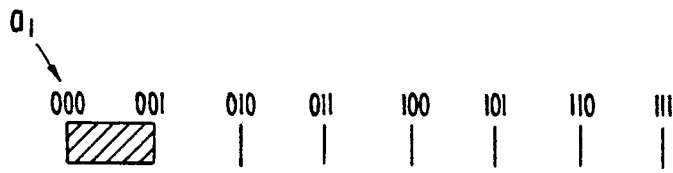
FIG. 10 illustrates the mechanism of correcting the operand length.
Figure 10B:
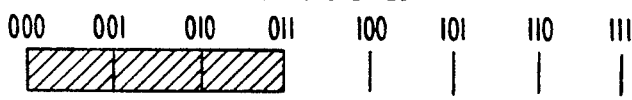
Figure 10C:
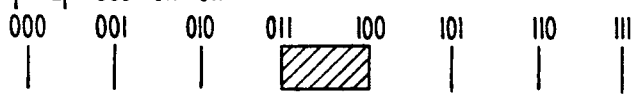
Figure 10D:
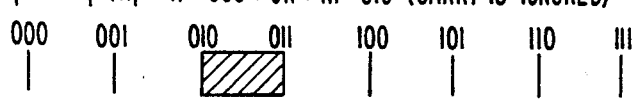

Hereinafter will be described how the operand length is corrected. Supposing that the effective address $a_1$ is a byte address indicating the 000 address in a memory, the shaded area in FIG. 10A will be the byte data represented by the effective address $a_1$. If the operand length L1 is 3 bytes here, the operand should be present as indicated by the shaded part of FIG. 10B. Now, the final byte of the operand shown in FIG. 10B can be represented by adding the operand length $L_1$ to the leading address $a_1$ of the operand, i.e. $a_1 + L_1 = 000 + 011 = 011$, which is the byte indicated by the shaded part of FIG. 10C. Thus, when the final byte of an operand is to be represented, the operand length $L_1$ is corrected by adding a correction value $k_1$. In this particular embodiment, correction is achieved by adding a correction value $k_1 = -1$. In this case, the value of $a_1 + L_1 + k_1(a_1 + \underline{l}_1)$ is 010, by which the final byte of the operand data can be represented. The foregoing mechanism generates the corrected operand length value $\underline{l}_1$ by having the ALU 31 add the operand length $L_1$ and the correction value $k_1$.

At the same timing as these actions, from the outputs of the selector 28, the selection field of the selector 29, a request code indicating the type of the request to the memory (read request, write request or the like) and the contents of the data field of the input to the decoder 75 in the branching judgement circuit 58 are sent out to the register 16. Along with that, the contents of the referencing address field to be accessed in the next machine cycle of the control store 19 (hereinafter called the "next address field") are sent out to the register 4.

Then in cycle $T_3$, the output of the register file 5 provided from the register 11, that of the register file 7 from the register 12 and the contents of the D1 field from the register 13 are added by the AALU 30 to generate the effective address $a_1$. In cycle $T_2$, out of the contents of the control store 19 at its address 001H, those of the selection control field of the selector 29 were set into the register 16, so that the selector 29 selects the contents of the register 13 in accordance with what is instructed by the contents of the selection control field supplied via the signal line 56. (See step A of FIGS. 8A–8E, Output of selector 29=register 13.) The effective address thereby generated is sent out to the register 17 and, at the same time, to a register 9 via the selector 20. The following description supposes, for the sake of simplicity of explanation, the page size in this preferred embodiment to be $2^{12}$ bytes. As stated previously, the maximum operand length of an MVC instruction in this embodiment is $2^8$ bytes (256 bytes). Therefore, the (n−m) most significant bits of the n least significant bits of the effective address are the four most significant (12-8) bits of its 12 least significant bits. Said four bits are sent out via the signal lines 59, 60, 61 and 62 to the detecting circuit 57 for detecting the certain presence of the operand data on the same page.

Figure 2:
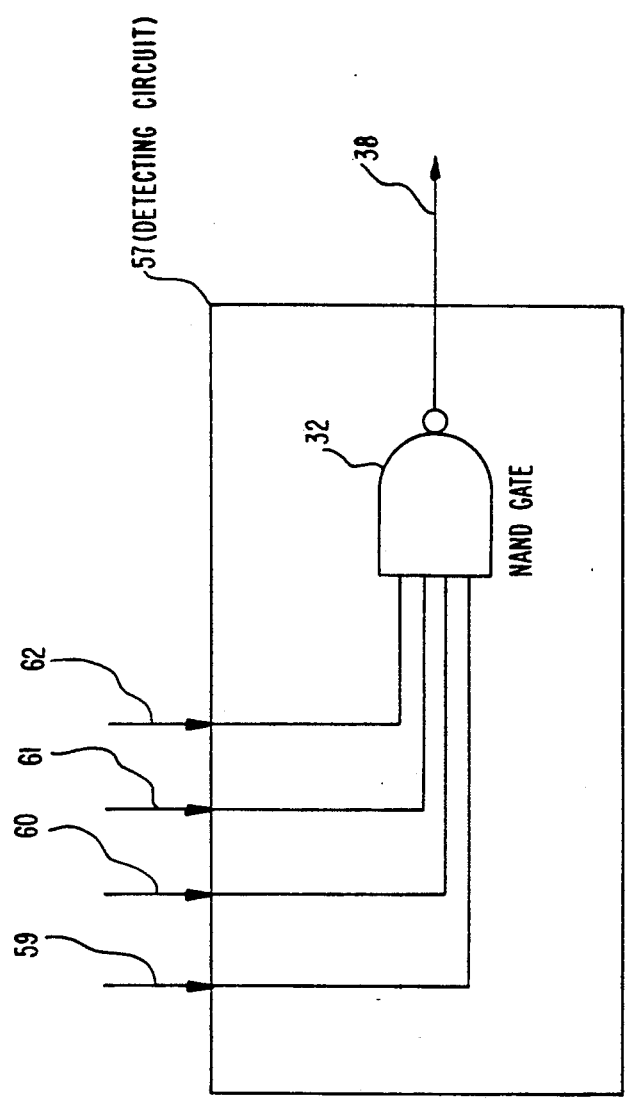
FIG. 2 illustrates the configuration of the detecting circuit 57 in FIG. 1.

Referring to FIGS. 1 and 2, the four most significant bits of the 12 least significant bits of the effective address $a_1$, supplied from the AALU 30 via the signal lines 59, 60, 61 and 62, are entered into a NAND gate 32. Unless every input is "1", the detecting circuit 57 detects the presence of all the data of operand 1 on the same page, and sends out "1" to the branching judgement circuit 58 via a signal line 74.

Now will be explained why the presence of all the data of operand 1 on the same page can be detected unless every one of the four most significant bits of the 12 least significant bits of the effective address $a_1$ is "1".

In this preferred embodiment, the page size is $2^{12}$ bytes, and the maximum operand length of an MVC instruction is $2^8$ bytes, so that, if the maximum operand length of 256 bytes is added to the leading address $a_1$ of the operand after operand length correction and the resultant sum is present on the same page, the data of operand 1 will be present on the same page without fail. Therefore, unless every one of the four most significant bits of the 12 least significant bits of the effective address $a_1$ is "1", even if the operand length $\underline{l}_1 (L_1 + k_1)$ of the MVC instruction is at its maximum of 255, as shown in Table 1 below, no carry from the most significant bit of the in-page address (the most significant bit of the 12 least significant bits of the effective address $a_1$) to the least significant bit of the page address (the 13th least significant bit of the effective address $a_1$) can take place.

TABLE 1

| | |
|---|---|
| 4 most significant of 12 least significant bits | 0111011111111 |
| | Addition |
| | 11111111 |
| | Max. operand length |
| Least significant bit of page address | 0111111111111 |
| | No carry |

According to the four most significant of the 12 least significant bits of the effective address $a_1$ supplied by the foregoing mechanism via the signal lines 59, 60, 61 and 62, the certain presence of the data of operand 1 on the same page can be detected. Further, according to a value (see FIGS. 8A–8E, Step A, Next address) 102H supplied to the register 4 at the same timing, as in cycle $T_2$, addresses 102H and 103H of the control store 19, except the least significant bit of the register 4, are sent out to the selectors 28 via the signal lines 51 and 52. The least significant bit of the register 4 is sent out to the branching judgment circuit 58 via the signal line 50. In the branching judgment circuit 58, an input for the decoder 75 supplied to the register 16 by Step A of FIGS. 8A–8E in cycle $T_2$ is entered into the decoder 75 via the signal line 68 in cycle $T_3$ (see FIGS. 8A–8E, Step A, Decoder 75 input). As the value of the input for the decoder 75 shown in Step A of FIGS. 8A–8E is 101, the output of the decoder 75 is 00001, and only the signal supplied via the signal line 74, out of the signal lines 73, 72, 71, 70 and 74 supplying the AND gates 33, 34, 35, 36 and 37, is made effective. Thus the AND gate 37 outputs "1" if the output of the detecting circuit 57, fed via the signal line 74, is "1", or outputs "0" if it is "0". Other AND gates 33, 34, 35 and 36 output "0" irrespective of the values fed via the input lines 73, 72, 71 and 70. Hereinafter will be described branching test conditions 1 to 4 indicated by the signal lines 73, 72, 71 and 70. The branching test conditions 1 to 4 are test factors to determine which of the control FW's stored in the control store 19, entered into the selector 28 via the signal lines 51 and 52, is to be used. Their examples include operand duplication. The control FW of a step before that to be read out designates which of these branch test conditions is to be made effective (decoder 75 input). These branch test conditions will not be individually described in detail here because they have no direct bearing on this preferred embodiment of the present invention. The output of the detecting circuit 57 and the least significant bit of the register 4, made effective by the foregoing procedure, are supplied to the OR gate 38. The least significant bit of the register 4 fed via the signal line 50 is "0" because, as stated above, the content of the register 4 is 102H. Therefore, the output of the OR gate 38 depends on that of the detecting circuit 57. Thus, referring to FIGS. 1, 2, 4 and 5 together, if the presence of the data of operand 1 on the same page is confirmed by the detecting circuit 47, "1" is outputted, and the control FW designated by address 103H (FIGS. 8A–8E Step G) supplied to the selector 28 is selected.

Referring now to FIGS. 1, 2, 6 and 7, if the presence of the data of operand 1 on the same page fails to be confirmed, i.e. if every one of the four most significant bits of the in-page address is "1", "0" will be outputted, and the control FW designated by address 102H (FIGS. 8A–8E Step B) supplied to the selector 28 is selected. As Steps G and B shown in FIGS. 8A–8E are both used for controlling the generation of the effective address $a_2$, and differ from each other only in the address field of the immediately following step, they will be described together. The control FW Step G (or Step B) selected by the selector 28 is fed via the signal line 54 to the selectors 20, 22, 23, 24, 25 and 26. Each of these selectors 20 and 22 to 26 selects the AALU output, the output of the register file 6 at the time of generating the effective address $a_2$, the output of the register file 8 at the time of generating the effective address $a_2$, the D2 field of the displacement section at the time of generating the effective address $a_2$, the correction value $k_1$ and the operand length L2 field of the operand and, after adding them with the registers 9, 11, 12 and 13 and the ALU 31, supplies data to the register 15. As stated above (cycle $T_3$), the effective address $a_1$ is supplied to the register 17, and a read request code for the effective address $a_1$ to the memory, held by the register 16 at the same time, is sent out to the register 18. At the same time, part of the information of the control FW of Step G (Step B), as at Step A of FIGS. 8A–8E, is supplied to the register 16, and the next address 106H (or 102H at Step B) is supplied to the register 4. In the next machine cycle $T_4$, an index qualifier set in the register 11, a base qualifier set in the register 12 and the content of the D2 field selected by the selector 29 and set in the register 13 are supplied to the AALU 30. The AALU 30 subjects the supplied data to a three-input addition, to generate the effective address $a_2$, and sends out the generated effective address $a_2$ to the register 17 and the selectors 21 and 22. The four most significant of the 12 least significant bits of the effective address $a_2$, as at the time of generating the effective address $a_1$, are sent out to the detecting circuit 57, which, detecting the certain presence of operand 2 on the same page, sends out this result of detection to the branching judgment circuit 58. In the branching judgment circuit 58, the contents 101 of the control FW Step G (or Step B), already set in the register 16 as an input to the decoder 75, is sent out and, as in cycle $T_3$, the output of the detecting circuit 57 is made effective. As the referencing address of the control store 19 set in the register 4 is 106H in cycle $T_3$ (or 102H if Step B is selected in cycle $T_3$), addresses 106H and 107H (or 102H and 103H) of the control store 19, except the least significant bit of the register 4, are referenced as in cycle $T_3$, the control FW Step H stored at 106H (or the control FW Step C stored at 102H) is sent out to the selector 28 via the signal line 51, and the control FW Step I stored at 107H (or the control FW Step F stored at 103H) is sent out to the selector 28 via the signal line 52. Here, the branching judgment circuit 58 makes effective the output of the detecting circuit 57. Therefore, if the detecting circuit 57 detects the certain presence of the second operand on the same page, the control FW Step I (or Step F) entered into the selector 28 will be selected. Conversely, if the certain presence of the second operand on the same page fails to be detected, the control FW Step H (or Step C) entered into the selector 28 is selected.

As the request control differs with the result of detection by the detecting circuit 57 for operands 1 and 2, each case will be separately described below.

Figure 4:
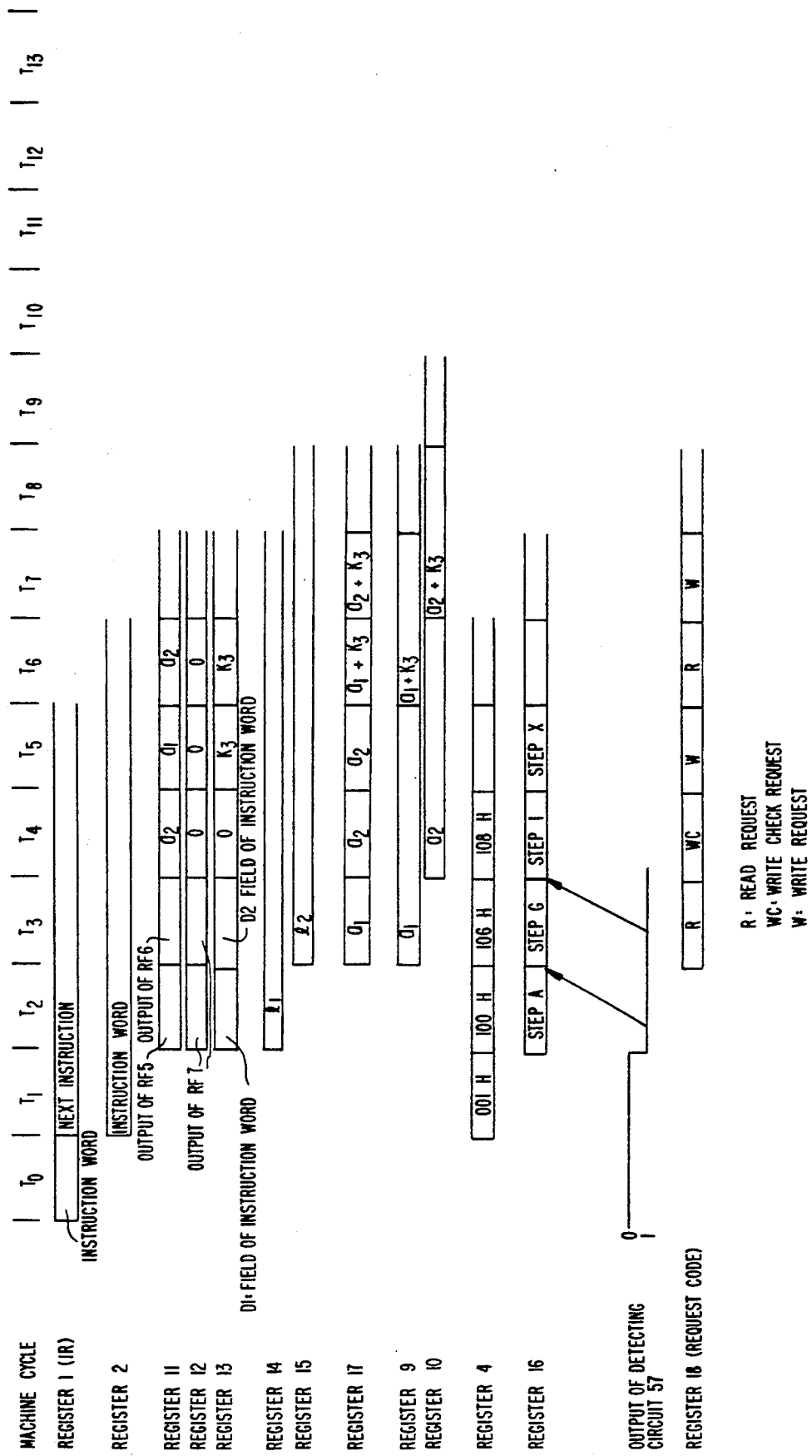
FIGS. 4, 5, 6 and 7 are charts for describing the operation of the first preferred embodiment of the invention.

First, if the certain presence of both operands 1 and 2 on the same page is detected by the detecting circuit 57 (Case 1), Steps G and I will be selected in cycles $T_3$ and $T_4$, respectively. As, in this case, the presence of both operands 1 and 2 on the same page is detected, no check request is required to check if the trailing edge bytes (the bytes indicated by the addresses of $a_1 + l_1$ and $a_2 + l_2$) of the operands are ready on the memory. Therefore, as shown in FIG. 4, after $a_1$ read and $a_2$ write check operations are performed, write request $a_2$ write to operand 2 becomes immediately issuable. Accordingly, at the control FW Step I, control is so achieved as to issue an $a_2$ write request to each object of control. Therefore, so that the output of the AALU 30 may indicate the effective address $a_2$, the selectors 22, 23 and 24 respectively select the AALU output ($a_2$ was generated in the preceding cycle), "0" and "0" in response to contents supplied via the signal line 54, and supply them to the registers 11, 12 and 13. At this timing (cycle $T_4$), a request code (write check) to the effective address $a_2$ indicated by Step G, set in the register 16, is supplied to the register 18. Then in machine cycle $T_5$, the AALU 30 subjects the contents of the registers 11, 12 and 13 ($a_2$, "0" and "0") to three-input addition to generate the effective address $a_2$, and sends it out to the register 17. Along with that, a request code (write) set in the register 16 is sent out to the register 18 and thereafter, until the operands of the MVC instruction are exhausted, the data of the first operand are moved to the position of the second in the memory to complete the execution of the MVC instruction. As hitherto described, in Case 1, the request control sequence for the MVC instruction is, as shown in FIG. 4, $a_1$ read, $a_2$ write check, $a_2$ write, $a_{1+k3}$ read (k3: the number of units of access to the memory), $a_{2+k3}$ write and so forth (the same in all cases at and after $a_{1+k3}$ read. This corresponds to Step A-Step G-Step I-Step X . . . in the flow chart of the control FW for the MVC instruction in FIGS. 8A–8E.

Next will be described a case in which the detecting circuit 57 detects the certain presence of operand 1, but not that of operand 2, on the same page (Case 2).

Figure 5:
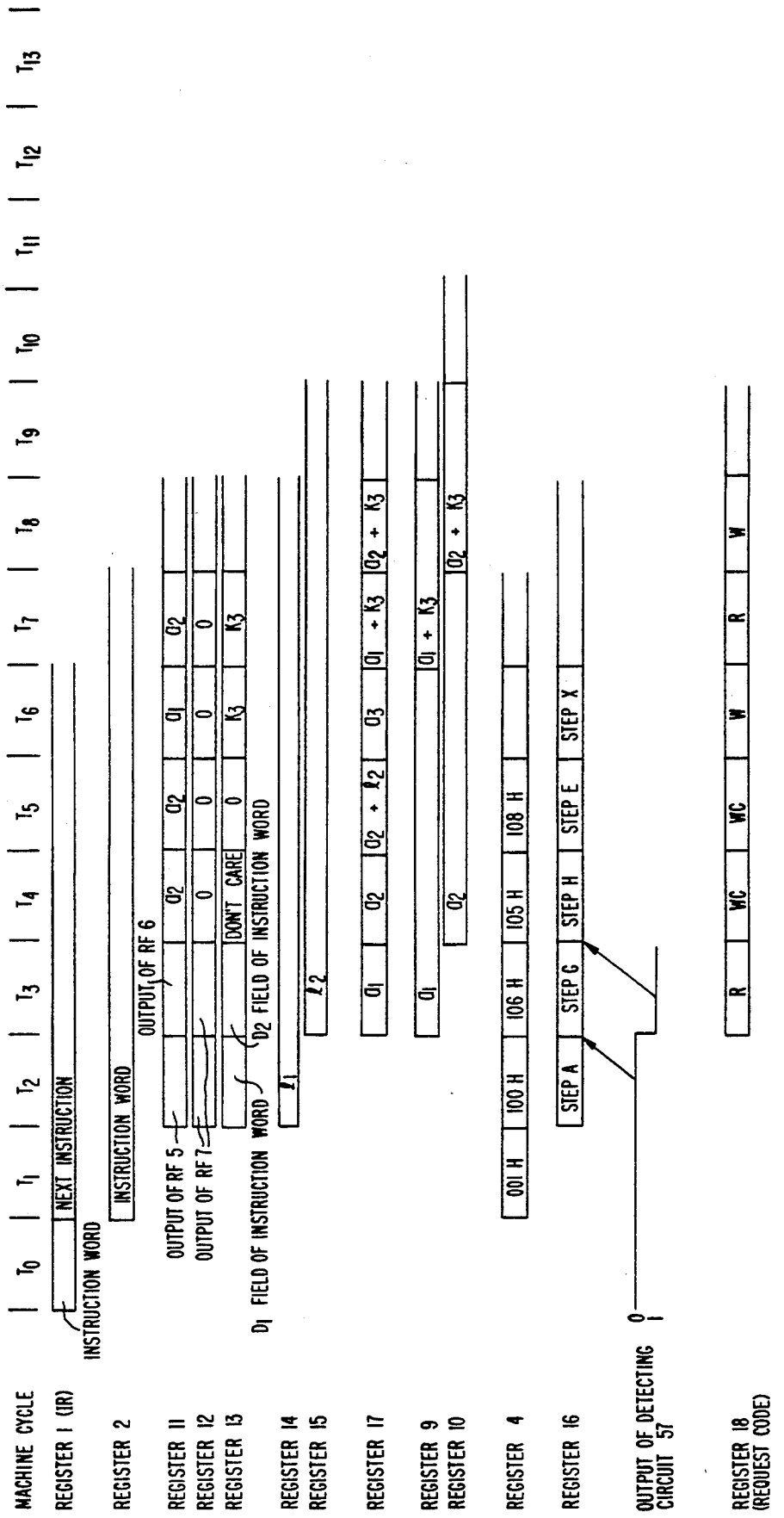

Referring to FIGS. 1, 3, 5 and 8A together, in Case 2, Steps G and H are selected in cycles $T_3$ and $T_4$, respectively. In this case, since the presence of operand 1 on the same page is detected by the detecting circuit 57, operand 1 needs no trailing edge check ($a_1+l_1$ read check), while operand 2 does need a trailing edge check ($a_2+l_2$ write check) request. At Step H, therefore, in order to control the generation of the effective address $a_2+l_2$, the selectors 21, 22 and 23 respectively select the AALU output ($a_2$ was generated in the preceding cycle), AALU output and "0" in cycle $T_4$ in response to contents provided via the signal line 54, and supply them to the register 10, 11 and 12. At this time, a request code (write check) to the effective address $a_2$ indicated by Step G, set in the register 16, is supplied to the register 18. Also at this time is supplied the next address 105H of Step H to the register 4. Then in machine cycle $T_5$, the registers 11 and 12 and the selector 29 select the output of the register 15, and their respective outputs $a_2$, "0" and $l_2$ are inputted to the AALU 30. The AALU 30 performs three-input addition to generate the effective address $a_2+l_2$, and sends it to the register 17. At Step H the input to the decoder 75 in the branching judgment circuit 58 is 000 as shown in FIGS. 8A–8E, so that the signal selected by the selector 28 depends only on the least significant bit of the register 4 as shown in FIG. 3. At this time: address 105H is held by the register 4; the control FW Steps D and E respectively indicated by addresses 104H and 105H are inputted to the selector 28, and the least significant bit of the register 4 is "1". Accordingly, the control FW Step E indicated by address 105H is selected by the selector 28; the effective address $a_2$, supplied to the register 10 in cycle $T_4$, is supplied to the register 11 via the selector 22, and "0", to the registers 12 and 13 via the selectors 23 and 24, respectively. At this time, a request code (write check) corresponding to the effective address $a_2+l_2$ indicated by Step H, having been stored in the register 16, is supplied to the register 18. Then in machine cycle $T_6$, the AALU 30 subjects the contents of the registers 11, 12 and 13 ($a_2$, "0" and "0") to three-input addition to generate the effective address $a_2$ and sends it out to the register 17. Along with that, a request code (write) set in the register 16 is sent out to the register 18 and thereafter, as in Case 1, until the operands of the MVC instruction are exhausted, the data of the first operand are moved to the position of the second on the memory to complete the execution of the MVC instruction. As hitherto described, in Case 2, the request control sequence for the MVC instruction is, as shown in FIG. 5, $a_1$ read, $a_2$ write check, $a_2+l_2$, $a_2$ write and so forth. This corresponds to Step A-Step G-Step H-Step E-Step X . . . in the flow chart of the control FW for the MVC instruction in FIGS. 8A–8E.

Next will be described a case in which the detecting circuit 57 fails to detect the certain presence of operand 1, but does detect that of operand 2, on the same page (Case 3).

In Case 3, Steps B and F are selected in cycles $T_3$ and $T_4$, respectively.

Figure 6:
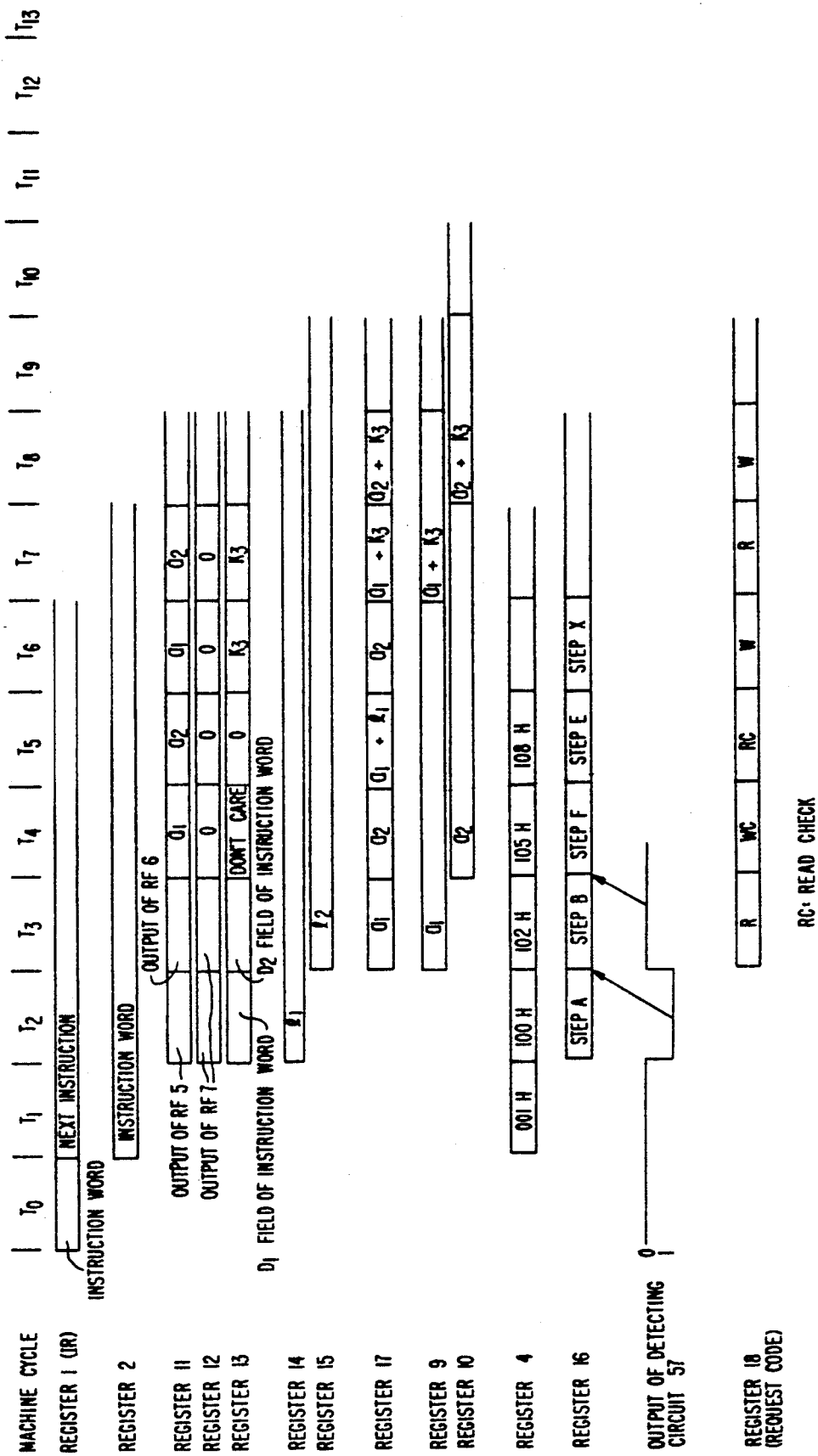
Figure 7:
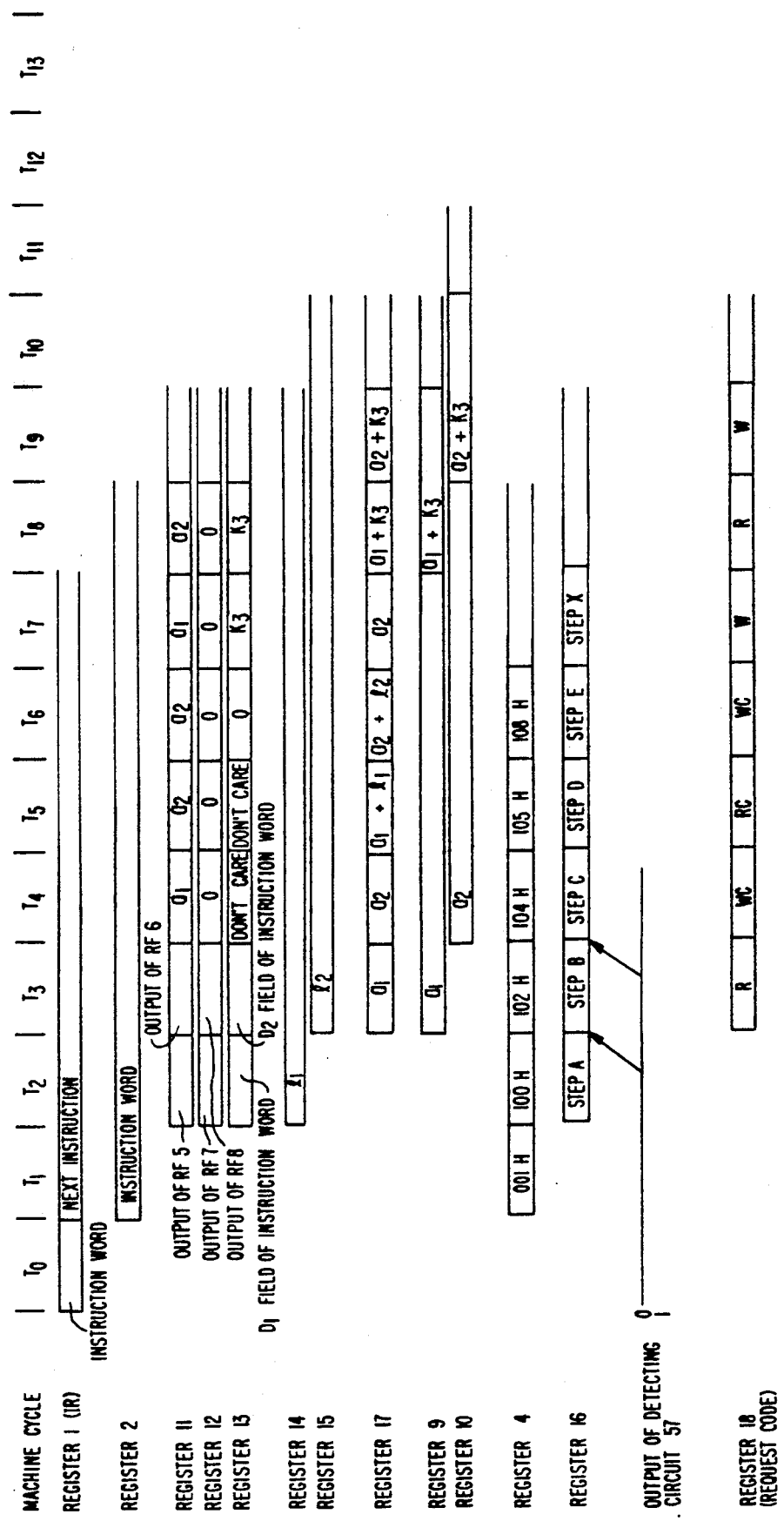
Figure 8A:
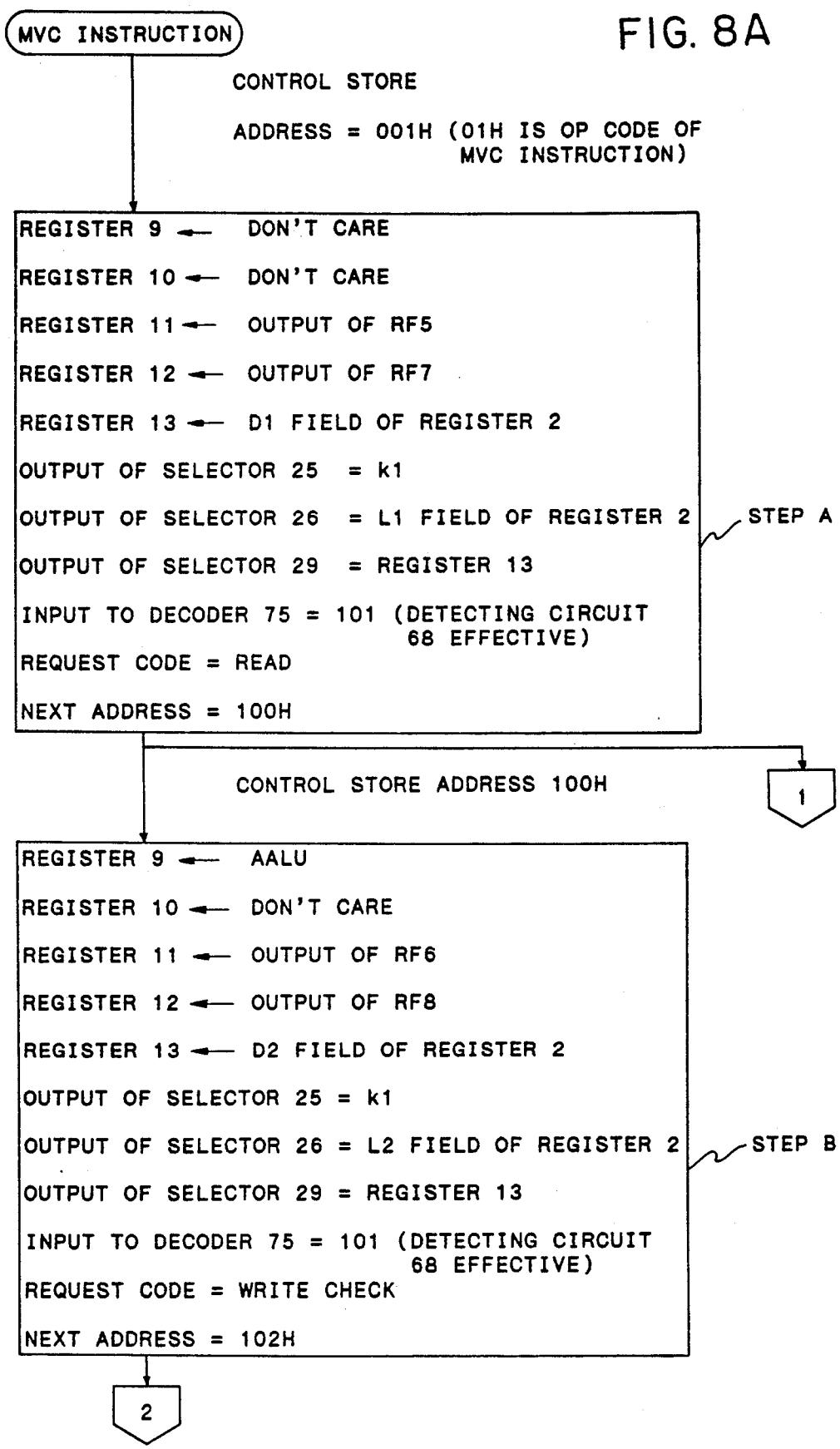
FIGS. 8A–8E are flow charts for describing the operation of the control firmware for MVC instructions for use in the preferred embodiment of the invention.
Figure 8B:
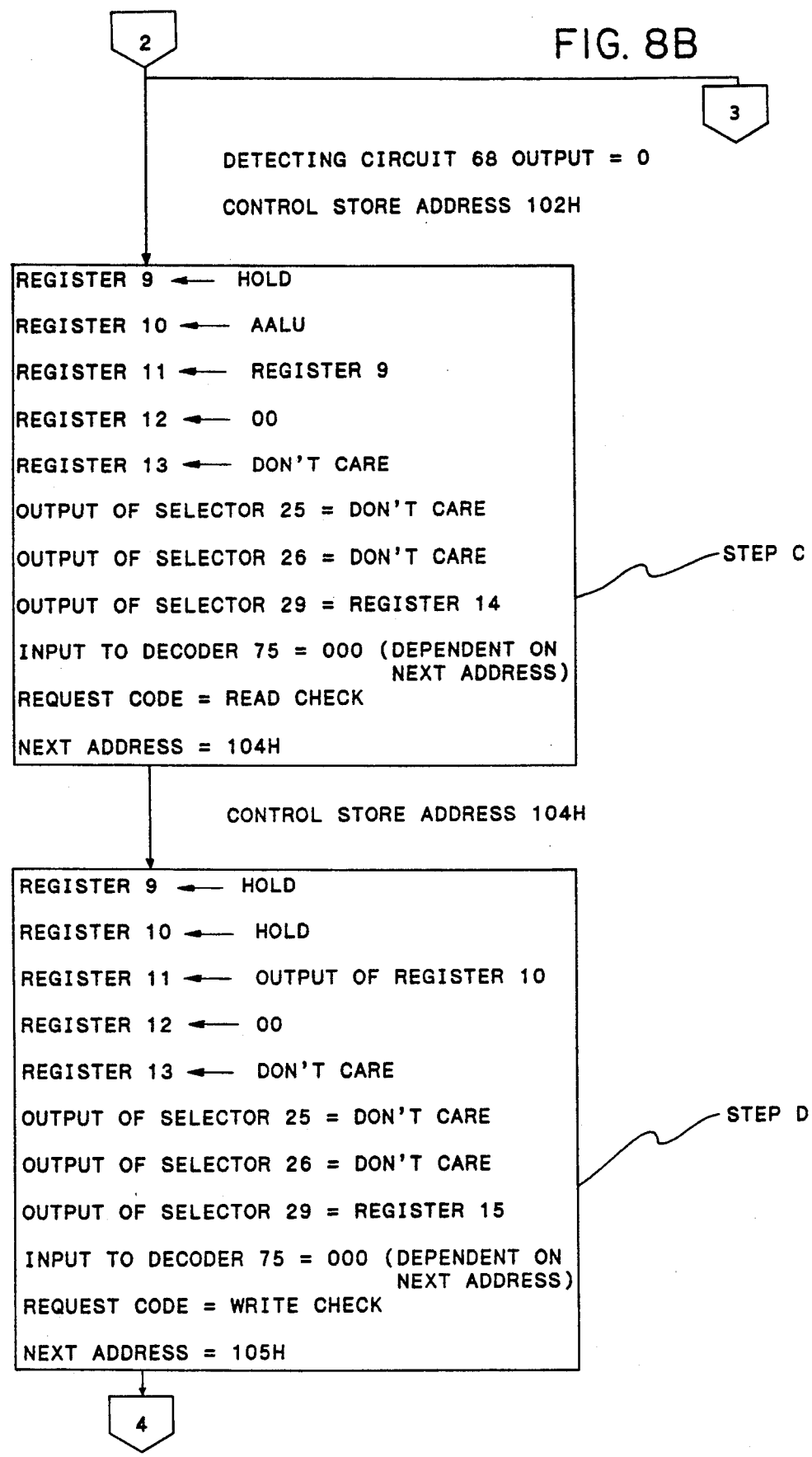
Figure 8C:
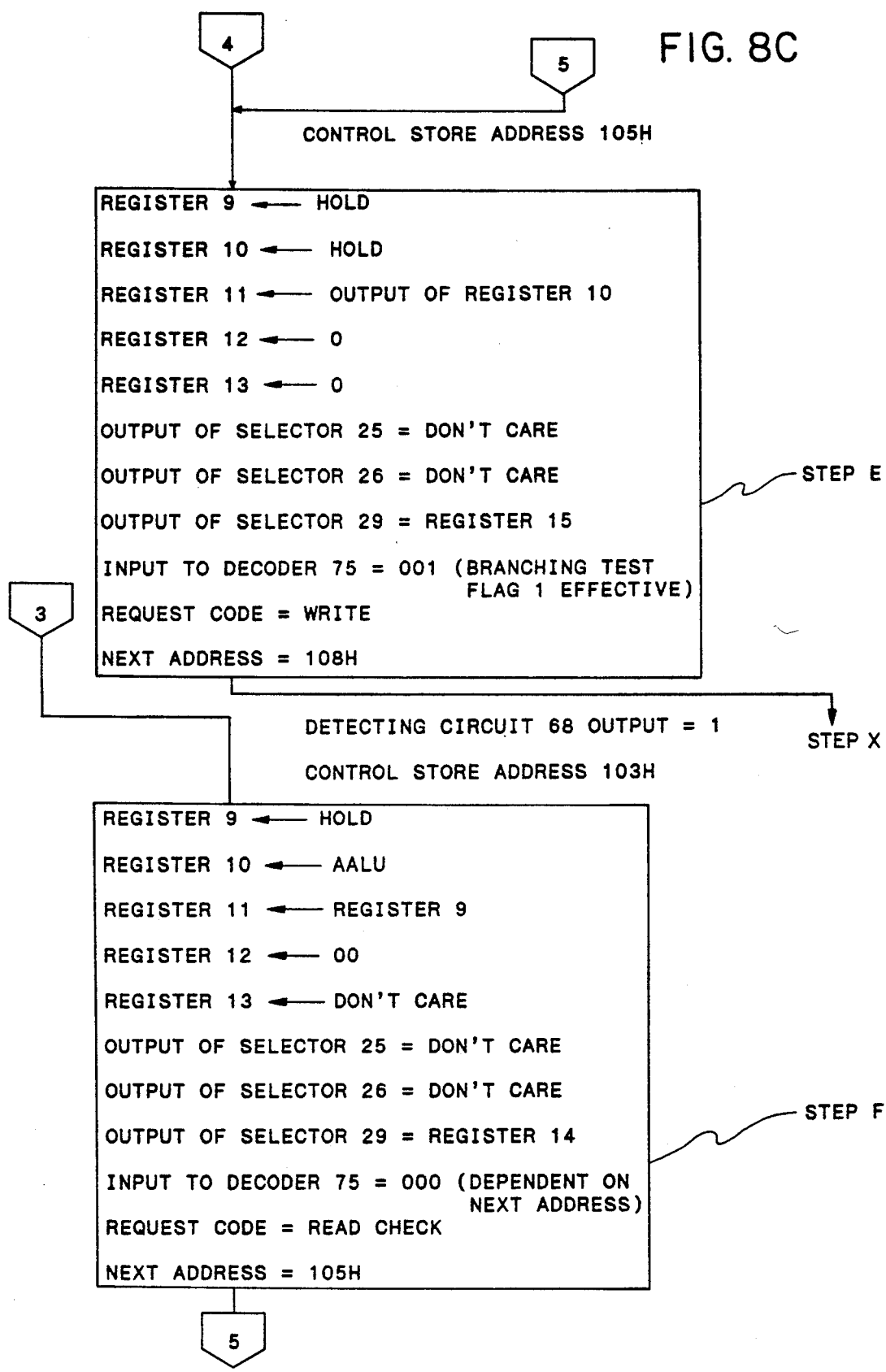
Figure 8D:
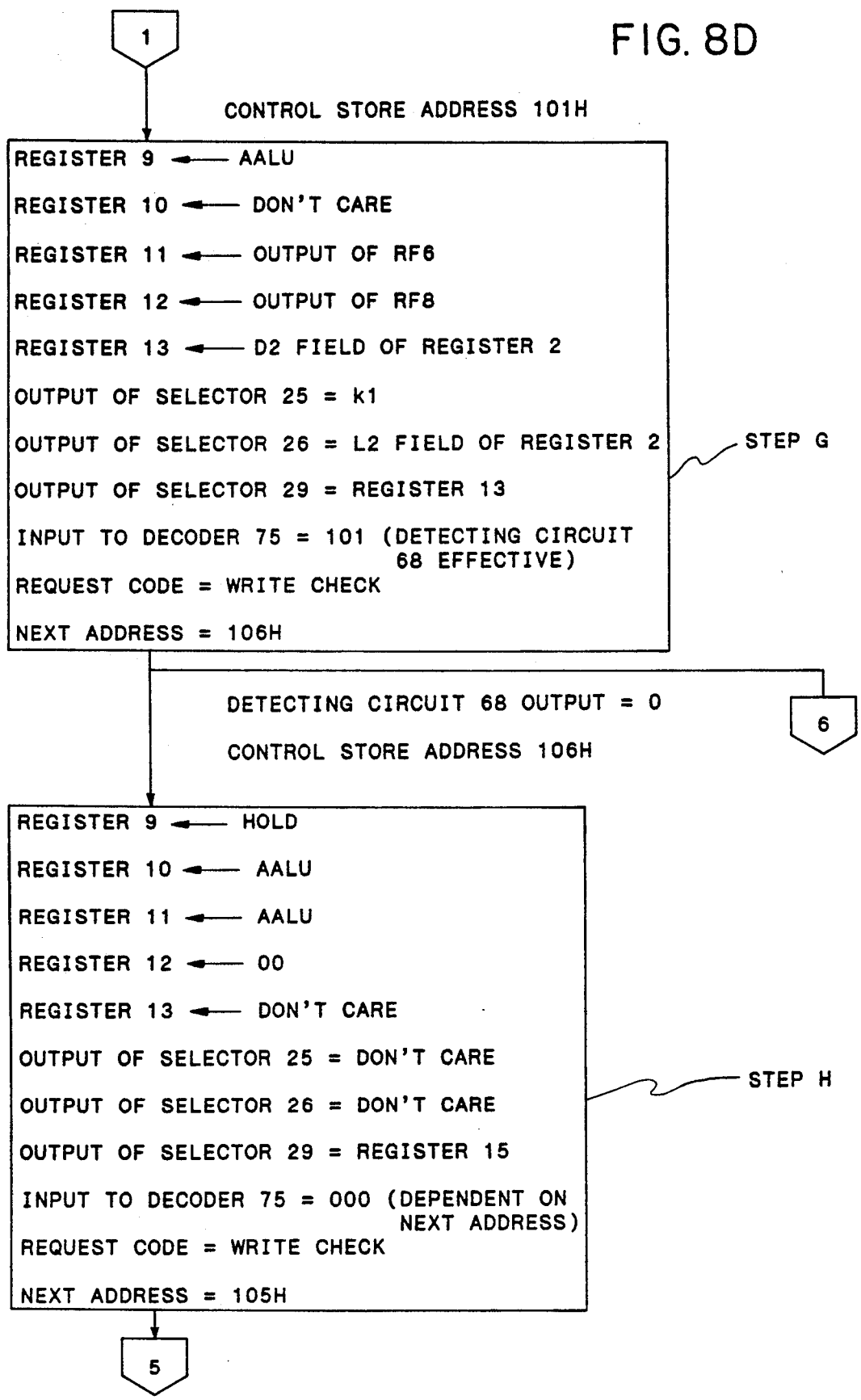
Figure 8E:
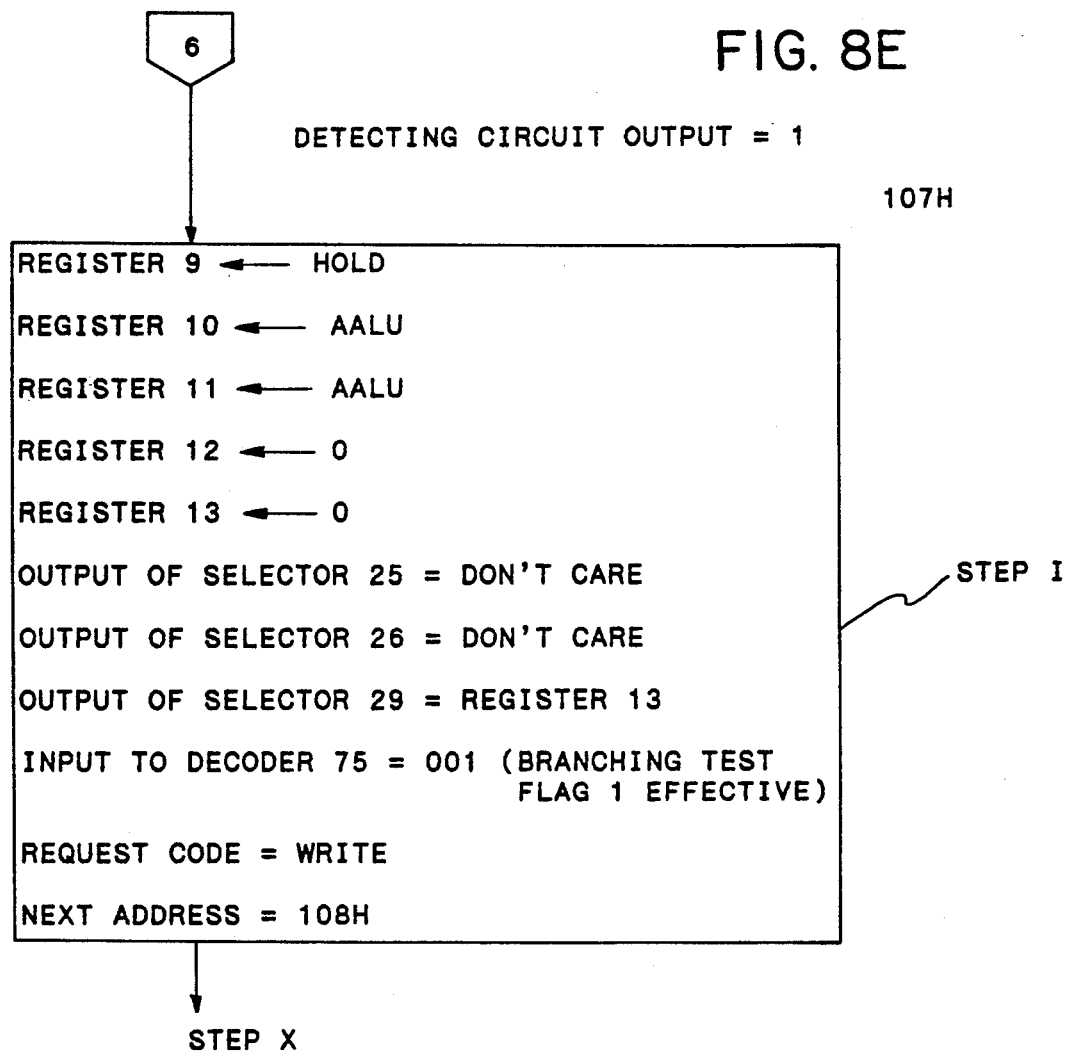

Referring to FIGS. 1, 3, 6 and 8A together, in this case, since the certain presence of operand 1 on the same page is not detected by the detecting circuit 57, operand 1 needs a trailing edge check ($a_1+l_1$ read check) request. At Step F, therefore, in order to control the generation of the effective address $a_1+l_1$, the selectors 21, 22 and 23 respectively select the AALU output ($a_2$ was generated in the preceding cycle), the output of the register 9 ($a_1$) and "0" in cycle $T_4$ in response to contents provided via the signal line 54, and supply them to the register 10, 11 and 12. At this time, a request code (write check) to the effective address $a_2$ indicated by Step B, set in the register 16, is supplied to the register 18. Also at this time the next address 105H of Step F is supplied to the register 4. then in machine cycle $T_5$, the outputs $a_1$, "0" and $1^1$ of the register 14 respectively selected by the registers 11 and 12 and the selector 29 are inputted to the AALU 30. The AALU 30 performs three-input addition to generate the effective address $a_1+l_1$, and supplies it to the register 17. At Step F the input to the decoder 75 in the branching instruction circuit 58 is 000 as shown in FIGS. 8A–8E Step F, so that the signal selected by the selector 28 depends only on the least significant bit of the register 4 as shown in FIG. 3. At this time, address 105H is held by the register 4, and the control FW steps D and E respectively indicated by addresses 104H and 105H are inputted to the selector 28. Since the least significant bit of the register 4 is "1" as stated above, the control FW Step E indicated by address 105H is selected by the selector 28, and the effective address $a_2$, supplied to the register 10 in cycle $T_4$, is supplied to the register 11 via the selector 22, and "0", to the registers 12 and 13 via the selectors 23 and 24, respectively. At this time, a request code (read check) corresponding to the effective address $a_1+l_1$ indicated by Step F, stored in the register 16, is supplied to the register 18. Then in machine cycle $T_6$, the AALU 30 subjects the contents of the registers 11, 12 and 13 ($a_a$, "0" and "0") to three-input addition to generate the effective address $a_2$ and sends it out to the register 17. Along with that, a request code (write) set in the register 16 is sent out to the register 18 and thereafter, as in Cases 1 and 2, until the operands of the MVC instruction are exhausted, the data of the first operand are moved to the position of the second on the memory to complete the execution of the MVC instruction. As hitherto described, in Case 3, the request control sequence for the MVC instruction is, as shown in FIG. 6, $a_1$ read, $a_2$ write check, $a_{1+1}1$, $a_2$ write and so forth. This corresponds to Step A-Step B-Step F-Step E-Step X . . . in FIGS. 8A–8E.

Finally will be described a case in which the detecting circuit 57 detects the certain presence of neither operand 1 nor operand 2 (Case 4).

Referring to FIGS. 1, 3, 7 and 8A together, in Case 4, Steps B and C are respectively selected in cycles $T_3$ and $T_4$.

In this case, since the certain presence of neither operand 1 nor operand 2 on the same page is confirmed by the detecting circuit 57, both operand 1 and operand 2 need a trailing edge check (respectively $a_1+l_1$ read check and $a_2+l_2$ write check) request. At Step C, therefore, in order to control the generation of the effective address $a_1+l_1$, the selectors 21, 22 and 23 respectively select the AALU output ($a_2$ was generated in the preceding cycle), the output of the register 9 ($a_1$) and "0" in cycle $T_4$ in response to contents fed via the signal line 54, and supply them to the registers 10, 11 and 12. At this time, a request code (write check) to the effective address $a_2$ indicated by Step B, set in the register 16, is supplied to the register 18. Also at this time the next address 104H of Step C is supplied to the register 4. Then in machine cycle $T_5$, the AALU 30 selects outputs of the register 14, and subjects the outputs $a_1$, "0" and $l_1$ to three-input addition to generate the effective address $a_1+l_1$, which is supplied to the register 17. At Step F the input to the decoder 75 in the branching instruction circuit 58 is 000 as shown in FIGS. 8A-8E Step C, so that the signal selected by the selector 28 depends only on the least significant bit of the register 4 as shown in FIG. 3. At this time, address 104H is held by the register 4, and the control FW Steps D and E respectively indicated by addresses 104H and 105H are inputted to the selector 28. Since the least significant bit of the register 4 is "1" as stated above, the control FW Step D indicated by address 104H is selected by the selector 28, and the effective address $a_2$ is supplied from the register 10 to the register 11 via the selector 22, and "0", to the register 12 via the selector 23. At this time, a request code (read check) corresponding to the effective address $a_1+l_1$ indicated by Step C, stored in the register 16, is supplied to the register 18. Then in machine cycle $T_6$, the AALU 30 receives the inputting of the respective outputs $a_2$, "0" and $l_2$ of the registers 11, 12 and 15, which is selected by the selector 29, and subjects them to three-input addition to generate the effective address $a_2+l_2$, which is supplied to the register 17. At Step D the input to the decoder 75 in the branching judgment circuit 58 is 000 as shown in FIGS. 8A-8E Step D, so that the signal selected by the selector 28 depends only on the least significant bit of the register 4 as shown in FIG. 3. At this time, address 105H is held by the register 4, and the control FW Steps D and E respectively indicated by addresses 104H and 105H are inputted to the selector 28. Since the least significant bit of the register 4 is "1", the control FW Step E indicated by address 105H is selected by the selector 28. In machine cycle $T_4$, the effective address $a_2$ supplied to and held by the register 10 is supplied to the register 11 via the selector 22, and "0", to the registers 12 and 13 via the selector 23 and 24, respectively. At this time, a request code (write check) corresponding to the effective address $a_2+l_2$ indicated by Step D, stored in the register 16, is supplied to the register 18. Then in machine cycle $T_7$, the AALU 30 subjects the contents of the registers 11, 12 and 13 ($a_2$, "0" and "0") to three-input addition to generate the effective address $a_2$, and sends it out to the register 17. Along with that, a request code 9write) stored in the register 16 is sent out to the register 18 and thereafter, as in Cases 1, 2 and 3, until the operands of the MVC instruction are exhausted, the data of the first operand are moved to the position of the second on the memory to complete the execution of the MVC instruction. As hitherto described, in Case 4, the request control sequence for the MVC instruction is, as shown in FIG. 6, $a_1$ read, $a_2$ write check, $a_1+l_1$ read check, $a_2+l_2$ write check, $a_2$ write and so forth. This corresponds to Step A-Step B-Step D-Step C-Step E-Step X ... in the control FW flow chart of the MVC instruction of FIGS. 8A-8E. In any case, request control at and after $a_2$ write has no direct bearing on the invention, and therefore its detailed description is dispensed with. So far has been described the first preferred embodiment of the invention.

As hitherto described, the first preferred embodiment of the present invention can process requests, such as MVC instructions, at high speed by referencing the (n−m) most significant bits of the n least significant bits of an effective address generated by address generation in the execution of an MVC instruction or the like to detect the certain presence of operand data on the same page and, if the certain presence of the operand data on the same page is detected, issuing no unnecessary check request.

Figure 11:
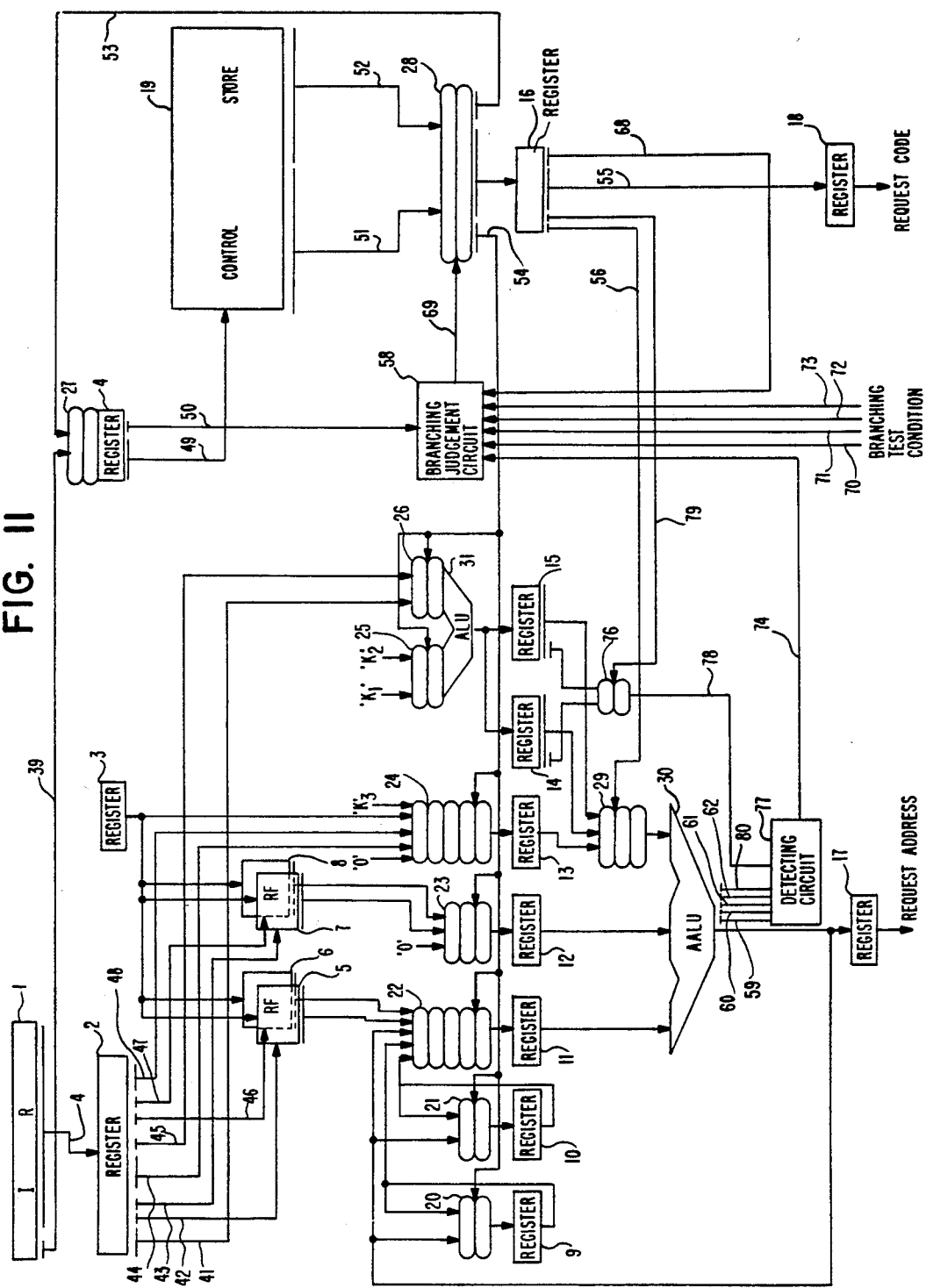
FIG. 11 illustrates the configuration of a second preferred embodiment of the invention.
Figure 12:
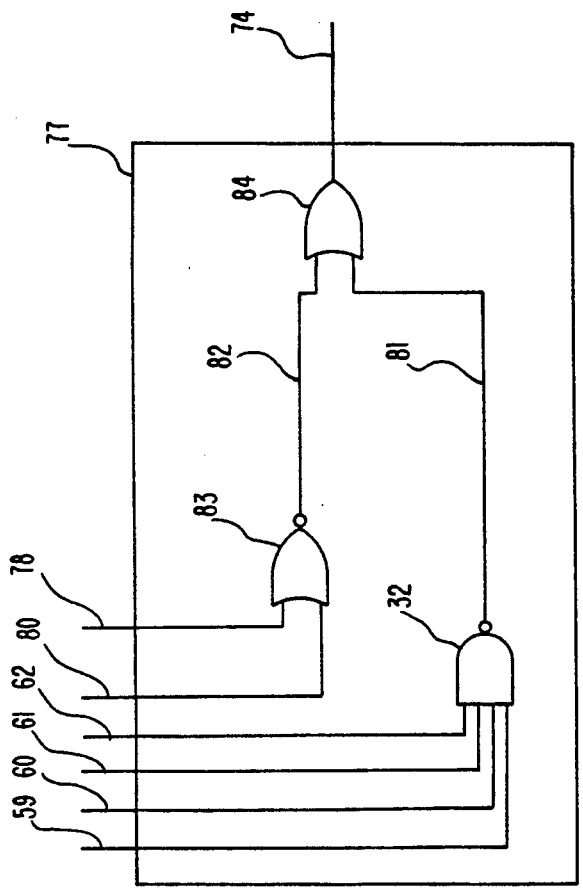
FIG. 12 illustrates the configuration of the detecting circuit 77 in FIG. 11.

Next will be described in detail a second preferred embodiment of the present invention with reference to FIGS. 11 and 12 in place of FIGS. 1 and 2, respectively.

The second preferred embodiment, like the first, references the (n−m) most significant bits of the in-page address of an effective address (the n least significant bits of the effective address) to detect the certain presence of operand data on the same page. The second embodiment, unlike the first, does not perform conditional detection, but detects the certain presence of the operand data by referencing the n−m+k bits of the in-page address of the effective address and the k most significant bits of the operand length. The following description of the second embodiment will concern only its differences from the already described first embodiment.

Referring to FIGS. 4, 5, 6 and 7 together, in machine cycle $T_3$, the AALU 30 adds the contents of the registers 11, 12 and 13 to generate an effective address $a_1$. At this time, the five most significant bits (12−8+1, k is supposed to be 1) of the 12 least significant bits of the effective address $a_1$ are sent out to a detecting circuit 77 via signal lines 59, 60, 61, 62 and 80. At the same time the single most significant bit (because k=1) of the operand length held by the register 14 controls a selector 76 from the register 16 via a signal line 79, and is sent out to the detecting circuit 77 via the signal line 78. The four most significant of the 12 least significant bits of the effective address $a_1$, sent out to the detecting circuit 77 via the signal lines 59, 60, 61 and 62 are entered into the NAND gate 32, whose output is supplied to an OR gate 84 via a signal line 81. The fifth most significant of the 12 least significant bits of the effective address $a_1$, sent out to the detecting circuit 77 via the signal line 80, is entered into a NOR gate 83 together with the most significant bit of the operand length, entered into the detecting circuit 77 via a signal line 78, and the output of the NOR gate 83 is sent out to the OR gate 84 via a signal line 82. The OR gate 84 receives inputs from the NAND gate 32 and the NOR gate 83, and sends out its output to the branching judgment circuit 58 via the signal line 74.

By the foregoing arrangement there will be detected the certain presence of the operand on the same page unless every one of the four most significant of the 12 least significant bits of the effective address $a_1$ is "1" or if both the fifth most significant of the 12 least significant bits of the effective address $a_1$ and the single most significant bit of the operand length are "0". Hereinafter will be explained how either of the above conditions makes it possible to detect the certain presence of the operand on the same page. As it was already explained with reference to the first preferred embodiment why, unless every one of the four most significant of the 12 least significant bits of the effective address $a_1$ is "1", the operand is present on the same page without fail, this point is dispensed with here, and here will be explained only the reason why, if both the fifth most significant of the 12 least significant bits of the effective address $a_1$ and the single most significant bit of the operand length are "0", the operand is certain to be present on the same page. As stated above, the page size in this embodiment is $2^{12}$ bytes and the maximum operand length of an MVC instruction is $2^8$ bytes. Therefore, as shown in Table 2 below, even if the maximum values are added together when both the fifth most significant of the 12 least significant bits of the effective address $a_1$ and the single most significant bit of the operand length are "0", no carry to the least significant bit of the page address can take place.

TABLE 2

```
                              0111101111111
                          /   Addition
                         /    01111111
                        /     01111111111111
Least significant bit of page address   No carry
```

The foregoing mechanism detects the certain presence of the operand on the same page. The only difference between this second preferred embodiment and the first is that between the operation of the detecting circuit 57 of the first and the detecting circuit 77 of the second when the effective address $a_1$ and $a_2$ are generated.

The second preferred embodiment of the present invention references the $(n-m+k)$ most significant bits of an effective address, generated by address generation in the execution of an MVC instruction or the like, and the k most significant bits of the operand length, and thereby detects the presence of the operand data on the same page more accurately than the first embodiment does, and issues no unnecessary check request if the certain presence of the operand data on the same page is detected. Because of this feature, the second embodiment has the benefit of processing requests, such as MVC instructions, at higher speed.

What is claimed is:

1. A request control apparatus for controlling a memory request in a computer system, said memory request involving executing an instruction having a variable-length operand, managing a main store having a page size of $2^n$ byte units by on-demand-paging processing and executing an instruction or an operation in not greater than $2^m$ (n is greater than m) byte operand units, including:

effective address generation means for generating an effective address corresponding to said memory request, said effective address including n least significant bits, said n least significant bits including $(n-m)$ most significant bits;

detection means, coupled to said effective address generation means, for detecting a presence of operand data on a particular memory page by referring to said $(n-m)$ most significant bits of said n least significant bits of said effective address; and means for preventing an issuance of a check request for said operand data if said detection means has detected said presence of said operand data on said particular page, thereby controlling said memory request.

2. A request control apparatus for controlling a memory request in a computer system, said memory request involving executing an instruction having a variable-length operand, managing a main store having a page size of $2^n$ byte units by on-demand-paging processing and executing an instruction or an operation in not greater than $2^m$ (n is greater than m) byte operand units, including:

effective address generation means for generating an effective address corresponding to said memory request, said effective address including n least significant bits, said n least significant bits including $(n-m+k)$ most significant bits;

detection means coupled to said effective address generation means for detecting a presence of operand data on a particular memory page by referring to said $(n-m+k)$ most significant bits of said least significant n bits of said effective address and k most significant bits of an operand length; and means for preventing an issuance of a check request for said operand data if said detection means has detected said presence of said operand data on said particular page, thereby controlling said memory request.

3. A method for controlling a memory request, said memory request involving executing in a computer system an instruction having a variable-length operand, managing a main store having a page size of $2^n$ byte units by on-demand-paging processing and executing an instruction or an operation in not larger than $2^m$ (n is larger than m) byte operand units, including the steps of:

generating an effective address corresponding to said memory request, said effective address including n least significant bits, said n least significant bits including $(n-m)$ most significant bits;

detecting a presence of operand data on a particular memory page by referring to said $(n-m)$ most significant bits of said n least significant bits of said effective address; and preventing an issuance of a check request for said operand data if said detecting step has detected said presence of said operand data on said particular page, thereby controlling said memory request.

4. A method of controlling a memory request, said memory request involving executing, in a computer system, an instruction having a variable-length operand, managing a main store having a page size of $2^n$ byte units by on-demand-paging processing and executing an instruction or an operation in not larger than $2^m$ (m is larger than m) byte operand units, including the steps of:

generating an effective address corresponding to said memory request, said effective address including n least significant bits, said n least significant bits including $(n-m+k)$ most significant bits;

detecting a presence of operand data on a particular memory page by referring to said $(n-m+k)$ most significant bits of said n least significant bits of said effective address and k most significant bits of an operand length; and preventing an issuance of a check request for said operand if said detecting step has detected said presence of said operand data on said particular page, thereby controlling said memory request.

* * * * *